(12) United States Patent
Schlachter et al.

(10) Patent No.: US 9,252,585 B2
(45) Date of Patent: Feb. 2, 2016

(54) CONNECTOR APPARATUS WITH SHIELDING CONTACT

(71) Applicant: Endress + Hauser GmbH + Co. KG, Maulburg (DE)

(72) Inventors: Marc Schlachter, Wehr (DE); Michael Hugel, Lorrach (DE); Romuald Girardey, Huningue (FR); Max Bauer, Rheinfelden (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 252 days.

(21) Appl. No.: 13/960,310

(22) Filed: Aug. 6, 2013

(65) Prior Publication Data
US 2014/0041939 A1 Feb. 13, 2014

(30) Foreign Application Priority Data

Aug. 10, 2012 (DE) .................... 20 2012 103 013 U
Aug. 13, 2012 (DE) ......................... 10 2012 107 406

(51) Int. Cl.
*H02G 15/02* (2006.01)
*H02G 15/007* (2006.01)
*H02G 15/013* (2006.01)
*H02G 3/06* (2006.01)

(52) U.S. Cl.
CPC .............. *H02G 15/007* (2013.01); *H02G 3/06* (2013.01); *H02G 15/013* (2013.01)

(58) Field of Classification Search
USPC ................... 174/74 R, 78, 84 R, 88 C, 77 R
See application file for complete search history.

(56) References Cited

U.S. PATENT DOCUMENTS

| 5,007,847 | A | * | 4/1991 | Dixon et al. | ................... 439/100 |
| 5,059,747 | A | * | 10/1991 | Bawa et al. | .................... 174/655 |
| 5,310,359 | A | * | 5/1994 | Chadbourne et al. | ......... 439/462 |
| 5,621,191 | A | * | 4/1997 | Norris | .................. H02G 3/0675 174/653 |
| 5,691,505 | A | * | 11/1997 | Norris | .................... H02G 15/04 174/51 |
| 6,034,325 | A | * | 3/2000 | Nattel et al. | ..................... 174/59 |

(Continued)

FOREIGN PATENT DOCUMENTS

| CH | 674599 A5 | 6/1990 |
| DE | 2252026 | 5/1974 |
| WO | 2005084325 A2 | 9/2005 |

OTHER PUBLICATIONS

German Search Report, German Patent Office, Munich, May 8, 2013.

*Primary Examiner* — William H Mayo, III
(74) *Attorney, Agent, or Firm* — Bacon & Thomas, PLLC

(57) ABSTRACT

A connector apparatus having a PG screw thread in a first end section and a first traversing bore, in which a first axial clamping surface is embodied. A grounding assembly has an electrically conducting, iris spring, is arranged in the first traversing bore and lies against the first axial clamping surface. An annular clamping body having a second traversing bore, a second frontside annular clamping surface, which surrounds the second traversing bore and which is arranged in the first bore facing the grounding assembly, wherein the grounding assembly is clampable between the clamping surfaces, whereby the iris spring is radially deflectable, wherein the clamping body has an external thread for engagement in an internal thread of the base body, and wherein the connector apparatus has with reference to the first end section of the base body, behind the grounding assembly a conduit screw thread for the connection of a conduit.

11 Claims, 1 Drawing Sheet

(56) References Cited

U.S. PATENT DOCUMENTS

| | | | |
|---|---|---|---|
| 6,639,146 B1 * | 10/2003 | Chiu | 174/359 |
| RE38,294 E * | 11/2003 | Nattel et al. | 174/59 |
| 6,812,406 B2 * | 11/2004 | Hand | 174/667 |
| 7,934,954 B1 * | 5/2011 | Chawgo | H01R 9/0524 439/578 |
| 8,129,633 B1 * | 3/2012 | Shemtov | F16L 19/061 174/652 |
| 8,513,543 B1 * | 8/2013 | Lin | H02G 15/013 174/656 |
| 2011/0147081 A1 | 6/2011 | Best | |

\* cited by examiner

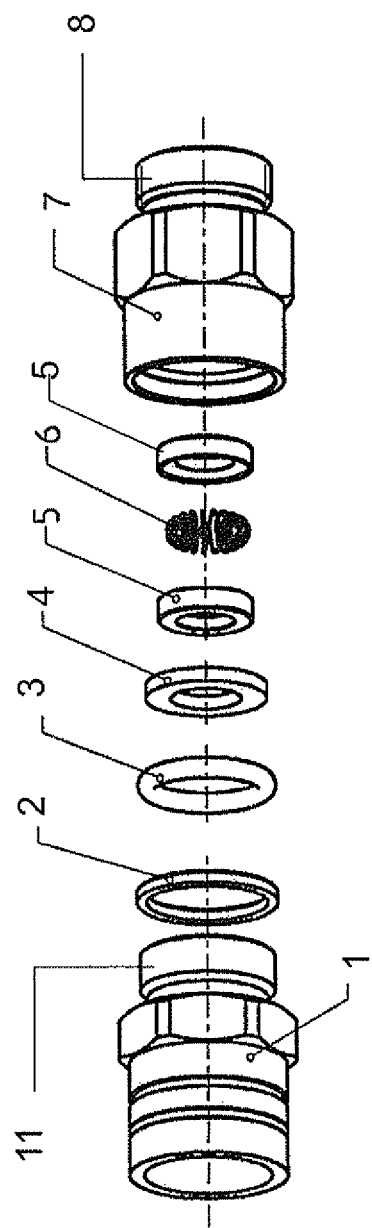
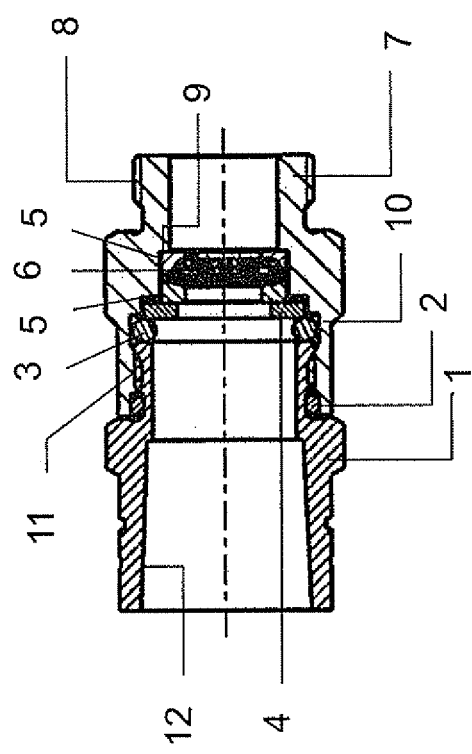

CONNECTOR APPARATUS WITH SHIELDING CONTACT

TECHNICAL FIELD

The present invention relates to a connector apparatus with shielding contact, for example, a PG cable gland, for connecting an electrical cable, which has a shielding and is surrounded by a conduit, to a field device while assuring an effective connecting of the cable shielding to ground.

BACKGROUND DISCUSSION

Known from the state of the art as connector apparatuses are cable glands with PG screw threads, for short, PG cable glands, which enable a simple connection of the cable shielding to housing ground. Thus, for example, the firm, Pflitsch, offers PG cable glands with a grounding assembly, which includes an iris spring. A cable end to be connected is inserted, with the shielding freed of insulation, through a union nut, a seal, the grounding assembly and a base body of the PG cable gland into a connection space of a housing. By advancing the union nut against the base body, the seal and the grounding assembly become axially clamped. This effects, on the one hand, a sealing action of the seal against the cable, and, on the other hand, an electrical contacting of the shielding via the iris spring of the grounding assembly, which, due to axial clamping between conical rings, is pressed radially inwards against the shielding.

The described connector apparatus is, however, not suitable for accommodating a cable with a conduit.

SUMMARY OF THE INVENTION

It is, therefore, an object of the present invention to provide a remedy for this.

The object is achieved according to the invention by the connector apparatus which includes: a base body, wherein the base body has a PG screw thread at least in a first axial end section of an outer lateral surface, wherein the base body has a first traversing bore, in which a first axial clamping surface is embodied, wherein the first axial clamping surface faces toward a second axial end section; a grounding assembly, which has an electrically conducting, iris spring, wherein the grounding assembly is arranged in the first traversing bore and lies against the first axial clamping surface; an annular clamping body, which has a second traversing bore, which is arranged aligned with the first traversing bore, wherein the clamping body has frontside a second annular clamping surface, which surrounds the second traversing bore, and which is arranged in the first bore facing the grounding assembly, wherein the grounding assembly is clampable between the first axial clamping surface and the second axial clamping surface, wherein the iris spring, by the clamping, is radially deflectable with reference to the axis of the first traversing bore, wherein the clamping body has an external thread for engagement in a complementary internal thread of the base body, wherein the connector apparatus has with reference to the first axial end section of the base body in axial direction behind the grounding assembly a conduit screw thread for the connection of a conduit.

The terminology "PG screw thread" is to be interpreted broadly in connection with the present invention. It refers not only to the standardized PG cable glands of DIN 46319, valid until end of 1999, but also to the since prescribed, metric cable glands M"n"×1.5, wherein "n"=12, 16, 20, 25, . . . , especially M20×1.5.

In a further development of the invention, the iris spring comprises a toroidal, helical spring.

In a further development of the invention, the iris spring comprises a ring with radially flexible, spring legs.

In a further development of the invention, the grounding assembly comprises at least one conical ring, preferably two conical rings, which is, respectively are, arranged between the clamping surfaces, wherein the iris spring is axially clamped between the two conical rings, or between a conical ring and one of the clamping surfaces.

In a further development of the invention, the connector apparatus further comprises an elastic element, which is clamped between one of the conical rings, respectively the conical ring, and one of the clamping surfaces on the side of the conical ring facing away from the iris spring.

In a further development of the invention, the connector apparatus further comprises a washer, which is arranged between the elastic element and the conical ring.

In a further development of the invention, the elastic element comprises an O-ring.

In a further development of the invention, the base body has, with reference to the first axial clamping surface, in the axial direction behind the iris spring, a surrounding annular groove, in which the elastic element engages.

In a further development of the invention, the conduit screw thread is an internal thread, especially a NPT½ or a G screw thread.

In a further development of the invention, the clamping body has the conduit screw thread.

BRIEF DESCRIPTION OF THE DRAWINGS

The invention will now be explained based on an example of an embodiment illustrated in the drawing, the figures of which show as follows:

FIG. 1 is an exploded view of an example of an embodiment of a connector apparatus of the invention; and FIG. 2 is a longitudinal section through the connector apparatus of FIG. 1.

DETAILED DISCUSSION IN CONJUNCTION WITH THE DRAWINGS

The connector apparatus shown in FIGS. 1 and 2 includes a clamping body 1 with a traversing bore, a sealing ring 2, an O-ring 3, which comprises an elastomer, a washer 4, two conical rings 5, an iris spring 6, which is embodied here as a toroidal, helical spring and is arranged between the two conical rings 5, wherein the conical rings 5 have, in each case, in at least one annular section, a conical surface, which faces the iris spring. Furthermore, the connector apparatus includes a base body 7 with a traversing bore, wherein the base body 7 has in a first axial end section on an outer lateral surface a PG screw thread 8, with which the base body 7 can, for example, be screwed into a field device housing. The bore through the base body includes toward the first axial end section a radial step to a smaller radius, whereby a first axial clamping surface 9 is formed, which faces away from the first axial end section. Supported on the first axial clamping surface 9 is a grounding assembly, which comprises the two conical rings 5 and the iris spring 6 arranged between them, as well as the washer 4 and the O-ring 6. The traversing bore of the base body 7 includes an annular groove 10, in which the O-ring 3 engages, wherein the other components of the grounding assembly are arranged between the O-ring 3 and the first axial clamping surface 9 and, thus, are secured against falling out, since the washer 4 is supported with one side on the O-ring 3 and holds with its other side the conical rings 5 with the intermediately lying, iris spring 6 in the bore.

Acting on the O-ring 3 is an annular end face of the clamping body 1, which serves as second axial clamping surface. Clamping body 1 includes in a first axial end section, which adjoins the ring shaped end face, on its lateral surface an external thread 11, with which the clamping body is screwed into a complementary internal thread in the bore through the first base body 7, wherein, through the screwing in, the second axial clamping surface axially clamps, via the O-ring 3 and the washer 4, the two conical rings 5 with the intermediately lying, iris spring 6, whereby the iris spring 6 is clamped, respectively squeezed, radially inwards.

In the case of installing a cable with the help of the connector apparatus, first of all, a cable with shielding is led through the still untightened connector apparatus, wherein the shielding in the region of the iris spring preferably has no insulation. By tightening the connector apparatus, thus screwing the clamping body 1 into the base body 7, the iris spring is pressed radially inwards against the shielding. Therewith, the shielding obtains via the metal iris spring and at least via the metal conical ring facing the first axial clamping surface 9 a reliable galvanic contact to the base body 7.

The clamping body 1 includes, finally, also a conduit screw thread 12, which is embodied here in the form of a NPT ½ thread in the bore of the clamping body.

The O-ring 3 functions, besides as retainer for the grounding assembly, also as an axial spring, whose operation is as follows. The iris spring 6, which is here in the form of a toroidal, helical spring, has, indeed, a large flexibility as regards the inner diameter, which it surrounds. This inner diameter is lastly determined by the variable periphery of the torus, thus the variable length of the helical spring, which forms the torus. When, however, by the axial clamping by means of the conical rings 5, an inner diameter is established, then this scarcely has any further radial flexibility. In order, nevertheless, to provide radial flexibility, with which, for example, thermal expansion differences or possible changes in the mechanical properties of the cable can be accommodated, an axially elastic prestress is required, which is provided by the O-ring 3. The O-ring 3 does not seal the connection between the base body 7 and the clamping body 1. For this, a sealing ring 2 is provided, which is clamped between the clamping body 1 and the base body 7 on the side of the O-ring 3 facing away from the iris spring 6.

The invention claimed is:

1. A connector apparatus, comprising:
    a base body, having a PG screw thread at least in a first axial end section of an outer lateral surface, said base body has a first traversing bore, in which a first axial clamping surface is embodied, said first axial clamping surface faces toward a second axial end section;
    a grounding assembly, which has an electrically conducting, iris spring, said grounding assembly is arranged in said first traversing bore and lies against said first axial clamping surface; and
    an annular clamping body, which has a second traversing bore, which is arranged aligned with said first traversing bore; said clamping body a second annular clamping surface at its frontside, which surrounds said second traversing bore, and which is arranged in the first bore facing said grounding assembly, wherein;
    said grounding assembly is clampable between said first axial clamping surface and said second axial clamping surface;
    said iris spring, by the clamping, is radially deflectable with reference to the axis of said first traversing bore;
    said clamping body has an external thread for engagement in a complementary internal thread of said base body; and
    the connector apparatus has with reference to the first axial end section of said base body in the axial direction behind said grounding assembly a conduit screw thread for the connection of a conduit.

2. The connector apparatus as claimed in claim 1, wherein: said iris spring comprises a toroidal, helical spring.

3. The connector apparatus as claimed in claim 1, wherein: said iris spring comprises a ring with radially flexible, spring legs.

4. The connector apparatus as claimed in claim 1, wherein: said grounding assembly comprises at least one conical ring, preferably two conical rings, which is, respectively are, arranged between said clamping surfaces; and said iris spring is axially clamped between said two conical rings, or between a conical ring and a clamping surface.

5. The connector apparatus as claimed in claim 4, further comprising:
    an elastic element, which is clamped between one of said conical rings, respectively the conical ring, and one of said clamping surfaces on the side of the conical ring facing away from said iris spring.

6. The connector apparatus as claimed in claim 5, further comprising:
    a washer, which is arranged between said elastic element and said conical ring.

7. The connector apparatus as claimed in claim 6, wherein: said elastic element comprises an O-ring.

8. The connector apparatus as claimed in claim 5, wherein: said base body has, with reference to said first axial clamping surface, in the axial direction behind said iris spring, a surrounding annular groove, in which said elastic element engages.

9. The connector apparatus as claimed in claim 1, wherein: said conduit screw thread is an internal thread.

10. The connector apparatus as claimed in claim 1, wherein: said clamping body has said conduit screw thread.

11. The connector apparatus as claimed in claim 9, wherein: said conduit screw thread is a $NPT^{1/2}$ or a G½ internal screw thread.

* * * * *